United States Patent
Gibbs et al.

(10) Patent No.: US 9,511,640 B2
(45) Date of Patent: Dec. 6, 2016

(54) AMPHIBIAN

(75) Inventors: Alan Timothy Gibbs, London (GB); Simon James Longdill, Warwickshire (NZ); Stephen James Bailey, Nuneaton (GB)

(73) Assignee: Gibbs Technologies Limited, Warwickshire (GB)

( * ) Notice: Subject to any disclaimer, the term of this patent is extended or adjusted under 35 U.S.C. 154(b) by 0 days.

(21) Appl. No.: 14/130,210

(22) PCT Filed: Jul. 2, 2012

(86) PCT No.: PCT/GB2012/051550
§ 371 (c)(1),
(2), (4) Date: Aug. 27, 2014

(87) PCT Pub. No.: WO2013/001318
PCT Pub. Date: Jan. 3, 2013

(65) Prior Publication Data
US 2014/0370765 A1  Dec. 18, 2014

(30) Foreign Application Priority Data

Jun. 30, 2011 (GB) .................................. 1111194.5
Jun. 30, 2011 (GB) .................................. 1111200.0

(51) Int. Cl.
*B60F 3/00* (2006.01)
*B63H 5/07* (2006.01)
(Continued)

(52) U.S. Cl.
CPC ........... *B60F 3/0084* (2013.01); *B60F 3/0007* (2013.01); *B60F 3/0038* (2013.01); *B63H 5/07* (2013.01);
(Continued)

(58) Field of Classification Search
CPC ......................................................... B60F 3/00
(Continued)

(56) References Cited

U.S. PATENT DOCUMENTS

| 3,280,785 A | 10/1966 | Mycroft |
| 3,421,472 A | 1/1969 | Oberg |

(Continued)

FOREIGN PATENT DOCUMENTS

| CN | 101918229 | 12/2010 |
| CN | 1019182321 | 12/2010 |

(Continued)

OTHER PUBLICATIONS

European Patent Office, International Search Report, Sep. 11, 2012.

*Primary Examiner* — Stephen Avila
(74) *Attorney, Agent, or Firm* — Price Heneveld LLP (57) ABSTRACT

The present invention provides, with reference to FIG. 2, an amphibian operable in land and marine modes, the amphibian comprising a hull, at least one discontinuity (wheel bay) provided in the hull, and at least one retractable wheel or track assembly at least partially located in the at least one discontinuity (wheel bay). The hull is a planning hull, and the at least one discontinuity (wheel bay) is provided in the front half of the hull of the amphibian. The amphibian further comprises at least one conduit which opens, or is provided with an entry which opens, into or at the at least one discontinuity (wheel bay) and is configured for channeling, in use, fluid away from the at least one discontinuity (wheel bay).

34 Claims, 8 Drawing Sheets (51) Int. Cl.
*B63H 11/02* (2006.01)
*B63B 1/04* (2006.01)

(52) U.S. Cl.
CPC .......... *B63H 11/02* (2013.01); *B60F 2301/00* (2013.01); *B63B 1/042* (2013.01)

(58) Field of Classification Search
USPC ....................................................... 440/12.5
See application file for complete search history.

(56) References Cited

U.S. PATENT DOCUMENTS

| | | |
|---|---|---|
| 3,895,596 A | 7/1975 | Amour |
| 4,958,584 A | 9/1990 | Williamson |
| 5,417,177 A | 5/1995 | Taguchi et al. |
| 5,765,497 A | 6/1998 | Thomas et al. |
| 6,066,014 A | 5/2000 | Smith et al. |
| 8,221,174 B2 * | 7/2012 | March ........................ 440/12.51 |
| 2003/0060095 A1 | 3/2003 | Gong |
| 2004/0157507 A1 | 8/2004 | Pease |
| 2007/0119157 A1 | 5/2007 | Longdill et al. |
| 2009/0061702 A1 | 3/2009 | March |
| 2011/0045715 A1 | 2/2011 | Gibbs |

FOREIGN PATENT DOCUMENTS

| | | |
|---|---|---|
| EP | 1442902 | 8/2004 |
| GB | 1433824 | 4/1976 |
| GB | 2401832 | 11/2004 |
| GB | 2401833 | 11/2004 |
| GB | 2452088 | 2/2009 |
| SU | 839744 | 6/1981 |
| WO | 99/24273 | 5/1999 |
| WO | 02/45978 | 6/2002 |
| WO | 2005115775 | 12/2005 |

* cited by examiner

FIG. 8

AMPHIBIAN

BACKGROUND OF THE INVENTION

The present invention relates to an amphibian and, in particular, to a high speed amphibian with a hull form configured with a single front wheel or track station, and/or for receiving single front wheel or track.

Amphibians for recreation, business, and/or military uses are known. In the past, designers of amphibians have focussed their efforts on optimising either on-water or on-land performance. As a result, either on-water performance has been sacrificed in order to give satisfactory on-land performance, or on-land performance sacrificed to give satisfactory on-water performance. The resulting amphibians are compromised to one degree or another.

To enable an amphibian to attain greater speed on water, it is desirable for the amphibian to be provided with a planing hull. Such a hull can be powered from standing where it is fully displaced to a speed where it can generate sufficient hydrodynamic lift to rise up out of the water and plane across the surface of the water. It is known for such amphibians to have a retractable wheel assembly that enables the wheels of the amphibian to be raised to a retracted position during use of the amphibian on the water. In addition, a hull provides buoyancy to the amphibian such that it floats while in the water.

Generally, for optimal performance, the surface of a planing hull should contain as few discontinuities as possible, as disruptions to the surface of the hull will increase drag and compromise both the hydrodynamic lift achievable and handling on water. However, the nature of an amphibian is such that it can require the surface of the hull to contain discontinuities, such as recesses within which components, for example wheel and suspension assemblies, are located. When attempting to optimise on-water performance, designers of amphibians with retractable wheel and suspension assemblies have expended great effort in providing movable cover mechanisms for wheel arch cut outs to re-establish the smooth uninterrupted lines of a conventional marine hull when the wheels are retracted. Movable covers and plates are known in amphibians for example from U.S. Pat. No. 4,958,584 (Williamson), U.S. Pat. No. 3,421,472 (Oberg), and U.S. Pat. No. 3,280,785 (Oberg). The sliding and/or hinging mechanisms of movable covers or plates are liable to seize up through corrosion, and/or through ingress of mud, sand, silt, salt, or other marine debris. They may also be damaged through collision with objects such as rocks during vehicle mode conversion or off-road use. An amphibian which cannot change mode may be immobilized; either on land, or even worse, on water. Furthermore, the necessity of maintaining and scrupulously cleaning sliding and/or hinging mechanisms may not likely be acceptable to the vehicle owner, who will be accustomed to the less onerous demands of modern cars and boats. Although movable covers or plates have been proposed in several amphibians patents as noted above, these have not made it to series production.

In addressing the above problems in the more recent past, the applicant has retained wheel arches in the hull but developed hydrodynamic aids such as planing plates to help recover at least part of the hull form (as disclosed in the applicant's UK patent no. GB2401832B) and strakes to improve directional stability of the hull when on the plane (as disclosed in the applicant's UK patent no. GB2401833B).

Hulls for amphibians comprising three or more wheels, at least two of which are provided at the front of the amphibian, typically provide sufficient buoyancy on water since the width of the amphibian, and thus the hull, span the width of the front and/or rear axle plus wheels. However, an amphibian having just one front wheel or wheel station presents unique challenges with respect to the hull shape, size, displacement etc., since the amphibian can be required to lean sideways during riding/turning on land, thereby requiring a hull with a relatively narrow width at least at the front, yet the hull must provide sufficient buoyancy to keep the amphibian afloat in the water. Prior art amphibian motorcycles have attempted to meet these challenges using additional movable flotation elements that extend from the hull while the amphibian is in the water. These movable flotation elements may take the form of inflatable bellows, movable or foldable flotation aids, or other forms. Such systems have been bulky, required additional moving parts/components, and can be prone to failure. As such, an amphibian motorcycle with a hull that does not require additional bellows, provides sufficient buoyancy for the amphibian to float in the water, and yet allows the amphibian to adequately lean/turn while on land would be desirable.

SUMMARY OF THE INVENTION

The applicant has developed a high speed amphibian with a single front wheel or track station, and/or single front wheel or track. The amphibian may comprise one or more rear wheel or track stations, and/or one or more rear wheels or tracks. Accordingly, the high speed amphibian may take the form of a motorcycle, tricycle or other configuration having a single front wheel or track station, and/or single front wheel or track. The amphibian need not be a motorcycle or tricycle (i.e. is not limited to an amphibian having handlebars for steering and/or sit astride seating). Alternatively, for example, the amphibian may take the form of a sit in vehicle or buggy. The amphibian can plane on water, yet has on-road, off-road and utilitarian capability. Surprisingly, this new amphibian capability has been achieved without using additional movable flotation elements that extend from the hull while the amphibian is in the water. To this end, the applicant has gone against conventional thinking and overcome previous technical prejudices in arriving at the configuration according to the present invention.

In particular, the applicant has developed the shape and configuration of the front bow section of the hull of the amphibian to include one or more conduits for channelling water in order to arrive at an optimised hull form for high speed amphibian use and which provides sufficient buoyancy. The optimised hull form retains an exposed frontal wheel bay which, without the conduit(s) of the present invention, suffered from accumulations of water resulting from forward motion of the amphibian. These water accumulations in the frontal wheel bay gave rise to significant spray and inefficiencies in pushing this accumulated water forwards. The optimised hull form provides for improved hydrodynamic performance of the amphibian when on water as the accumulation of water in the front wheel bay resulting from forward motion of the amphibian can travel along the or each conduit as well as or in place of having to pass under the bow portion of hull portion and on under the hull. Furthermore, the hull form is also optimised for land use of the amphibian.

Accordingly, the present invention provides, in a first aspect, an amphibian operable in land and marine modes, the amphibian comprising:

a hull;

at least one discontinuity provided in, or formed by, the hull; and at least one retractable wheel or track assembly at least partially located in the at least one discontinuity, wherein:

the hull is a planing hull;

the at least one discontinuity is provided in the front half of the hull of the amphibian; and the amphibian further comprises at least one conduit which opens, or is provided with an entry which opens, into or at the at least one discontinuity and is configured for channelling, in use, fluid away from the at least one discontinuity.

In a second aspect, the present invention provides an amphibian operable in land and marine modes, the amphibian comprising:

a hull;

at least one wheel or track bay provided in, or formed by, the hull; and at least one retractable wheel or track assembly at least partially located in the at least one wheel or track bay, wherein:

the hull is a planing hull;

the at least one wheel or track bay is provided in the front half of the hull of the amphibian; and the amphibian further comprises at least one conduit which opens, or is provided with an entry which opens, into or at the at least one wheel or track bay and is configured for channelling, in use, fluid away from the at least one wheel or track bay.

BRIEF DESCRIPTION OF THE DRAWINGS

Preferred embodiments of the present invention will now be described by way of example only with reference to the accompanying drawings, in which.

DETAILED DESCRIPTION OF THE PREFERRED EMBODIMENTS

Figure 1:
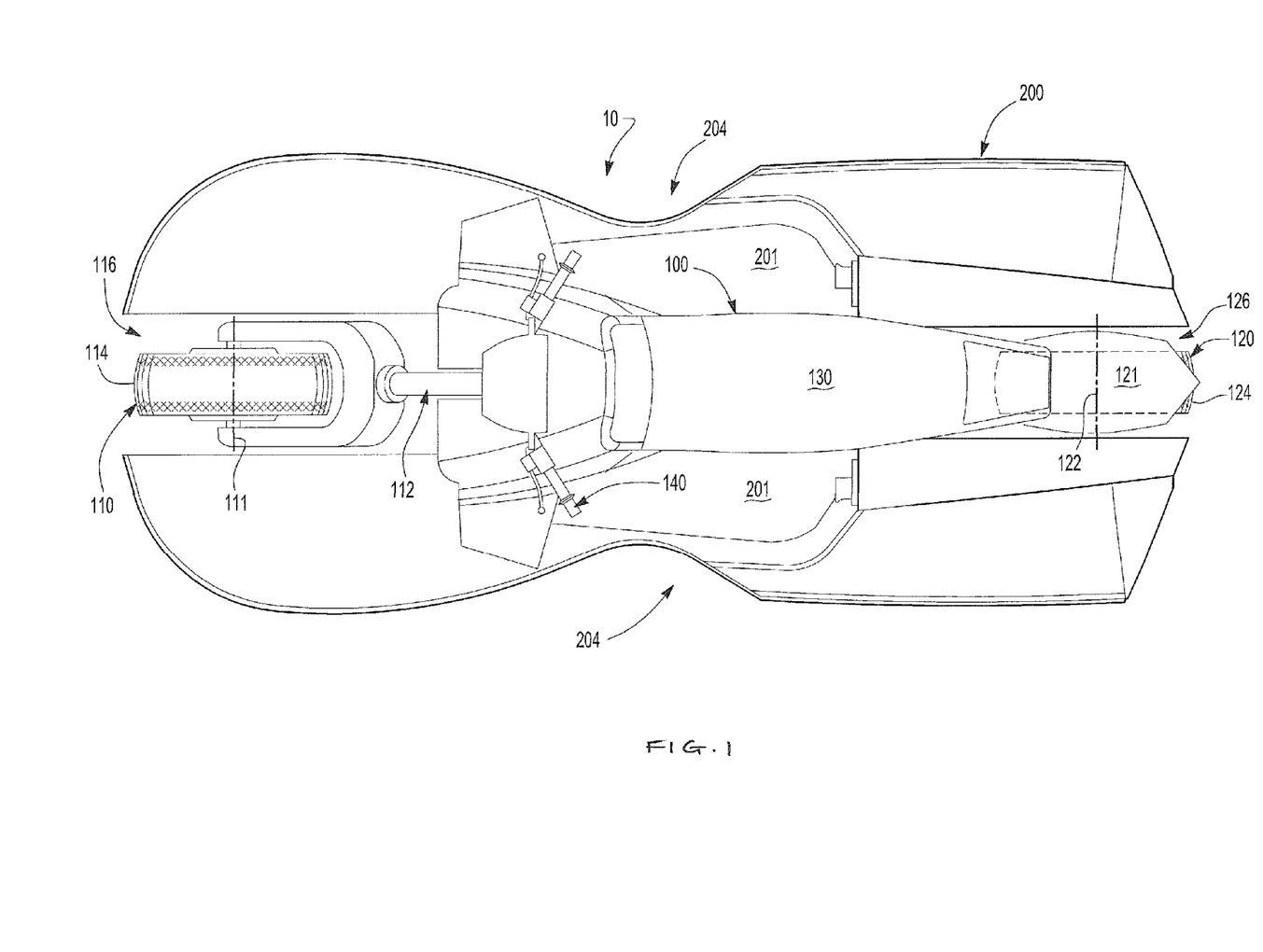
FIG. 1 is a schematic top plan view of an amphibian motorcycle according to a first preferred embodiment of the present invention.
Figure 2:
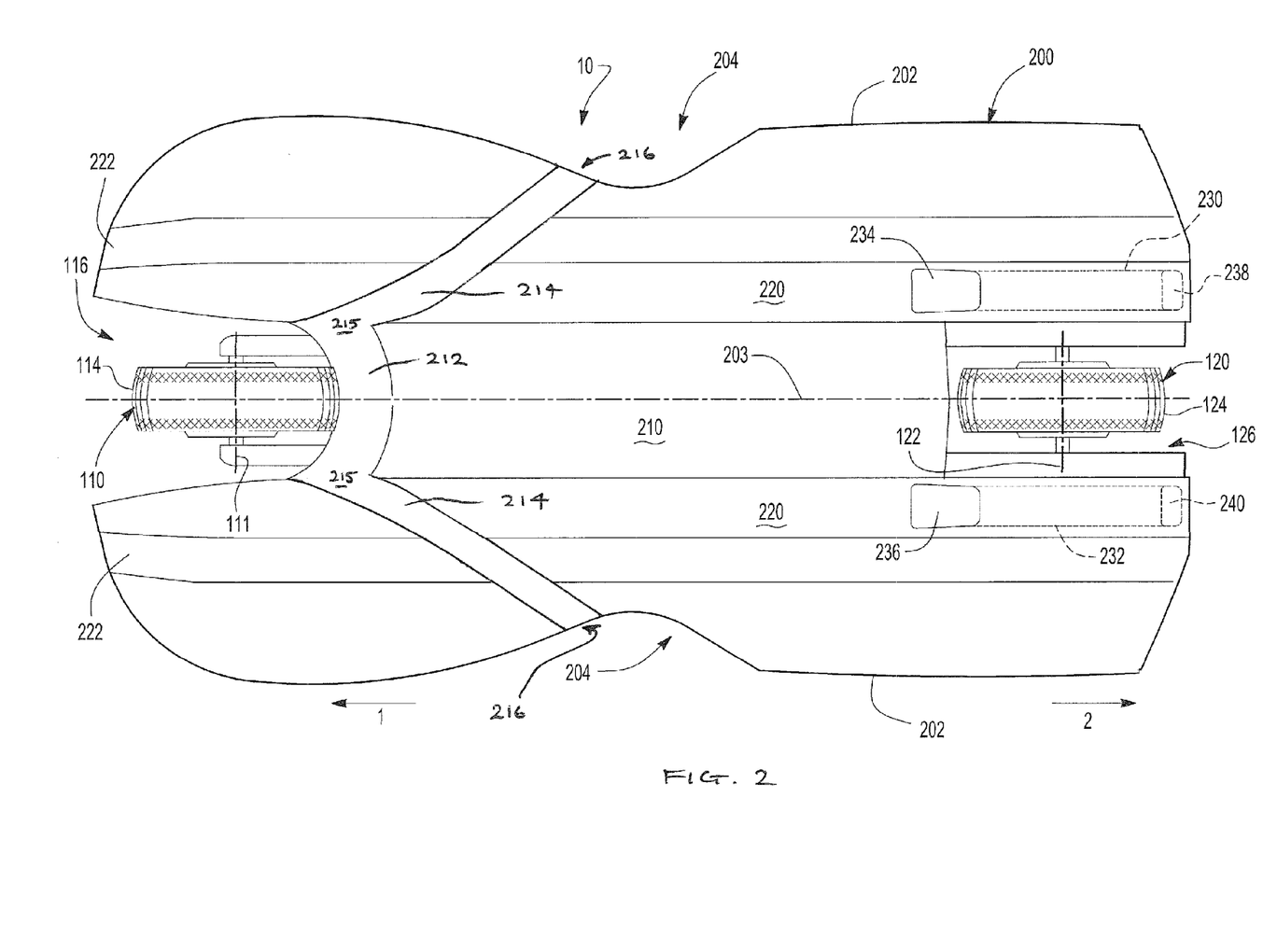
FIG. 2 is a schematic bottom plan view of the amphibian of FIG. 1.
Figure 3:
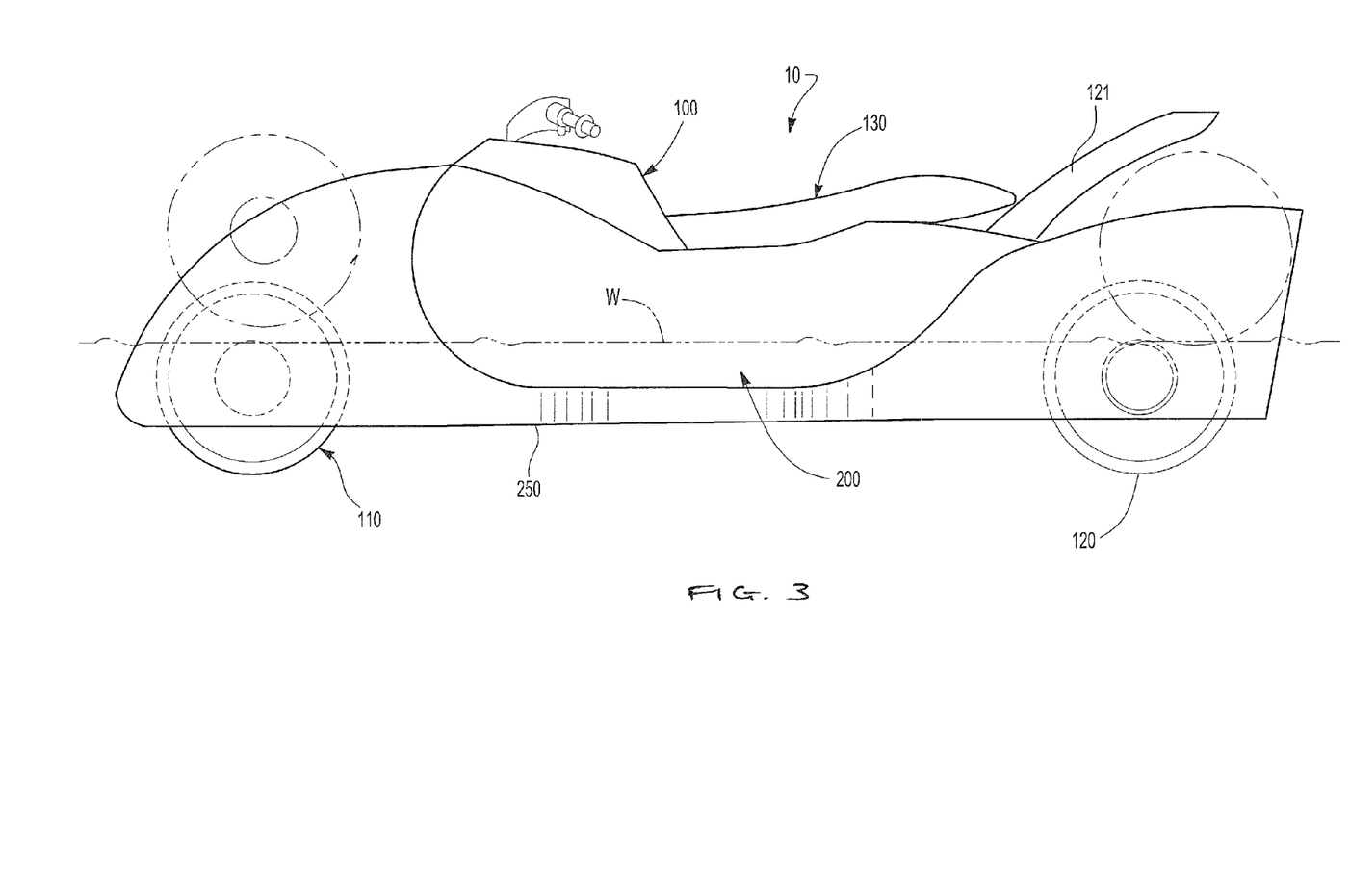
FIG. 3 is a schematic side elevation view of the amphibian of FIG. 1 illustrating indicatively the front wheel and the rear wheel in a protracted position and in a retracted position (in phantom)

Referring first to FIGS. 1 to 3, a first preferred embodiment of the present invention can be seen to comprise an amphibian motorcycle 10 that has desirable leaning and/or turning capability while in use on the land and desirable buoyancy and stability while in use on water. It will be appreciated that for the purposes of the present invention, the term motorcycle includes mopeds, scooters and other single-track two-wheeled vehicles. In addition, other single-track vehicles that use more than one wheel or track as a front wheel and/or rear wheel are included within the term motorcycle. For example, and for illustrative purposes only, a scooter that has two wheels spaced closely together for use as the front and/or rear wheel is included within the use of the term motorcycle herein. In this case, there is a front wheel station and a rear wheel station, with one or more wheels or tracks provided in each wheel station.

The amphibian 10 can be seen to comprise a front wheel 110, preferably provided with a front suspension system (not shown), and a rear wheel 120, again preferably provided with a rear suspension system (not shown). A track or tracks may be used as an alternative to either or both of the front and rear wheels 110, 120. At least one wheel retraction system (not shown) that is operable to move the front wheel 110 and/or the rear wheel 120 between a protracted position for use of the amphibian 10 on land and a retracted position for use of the amphibian 10 on water is preferably included. The front wheel 110 and/or the rear wheel 120 can then be moved between a protracted position, for use of the amphibian 10 on land (including entry into and egress from the water), and a retracted position for use of the amphibian on water. The front wheel 110 and/or the rear wheel 120 may moved into the retracted position to reduce drag when the amphibian 10 is operated in water. The amphibian 10 is provided with a hull 200 with a centre portion 210 and two oppositely disposed and spaced apart side portions 220. Alternative hull configurations are possible. Each hull portion 210, 220 has a forward end defining a bow or bow portion 212, 222 and the hull portions 210, 220 are preferably fixed relative to one another and form a generally rigid assembly with a generally continuous outer hull surface. The two side portions 220 extend forwardly beyond the centre portion 210 a predefined distance and form a front wheel bay 116. The front wheel 110 can be located at least partially within the front wheel bay 116 and the two side portions 220 can extend forwardly beyond a rotation axis 111 of the front wheel 110 when in the protracted land engaging position, although this is not essential. In some instances, the two side portions 220 can stop short of the rotation axis 111 of the front wheel 110, or can extend at least partially or generally up to or equal to a front surface of the front wheel 110. In the alternative, the two side portions 220 can extend beyond the front surface of the front wheel 110 when the front wheel 110 is in the protracted position. The two side portions 220 can also extend rearwardly beyond the centre portion 210 a predefined distance and form a rear wheel bay 126. The rear wheel 120 can be located at least partially within the rear wheel bay 126 and the two side portions 220 can extend rearwardly up to, or beyond, a rotation axis 122 of the rear wheel 120 when in the protracted position. In some instances, the two side portions 220 can extend rearwardly at least partially or generally up to or equal to a rear surface of the rear wheel 120 or, in the alternative, the two side portions 220 can extend rearwardly beyond the rear surface of the rear wheel 120 when the rear wheel 120 is in the protracted position.

A conduit 214 is provided in one or both of the two side portions 220 so as to provide at least one pathway between the front wheel bay 116 the respective lateral side or sides of the amphibian 10 for fluids (water and/or air) to pass. The or each conduit 214 may take any suitable form. For example, the conduit 214 may be open on the underside in the form of a channel, or may be at least partially closed (across and/or lengthways of the conduit 214) by the hull 200 or other part of the amphibian 10 so as to form a tunnel. Indeed, the conduit 214 may take the form of a tube (e.g. a discrete part or formed by other parts of the amphibian 10). The cross section of the conduit 214 may be substantially uniform, or may vary along its length. More particularly, the cross section of the conduit 214 may reduce along its length in the rearward direction 2. Alternatively, the cross section of the conduit 214 may increase along its length in the rearward direction 2. The entry 215 to the conduit 214 may be integrated with either one or more of the bow or bow portions 212, 222 of the hull portions 210, 220 or may be a discrete entry (such as with a discrete tube). Preferably, the entry 215 to the conduit 214 is open at and/or to the front wheel bay 116. The exit 216 from the conduit 214 may be an exit (discrete or otherwise) laterally to the side of the amphibian 10, or may be integrated with either one or both of the hull portions 210, 220. Alternatively, the conduit 214 may continue along a portion of, or the entire length of, the amphibian 10 exiting at the rear stern or transom, or into and/or at a rear wheel bay 126. The or each conduit 214 provides for improved hydrodynamic performance of the amphibian 10 when on water as the accumulation of water in the front wheel bay 116 resulting from forward motion of the amphibian 10 can travel along the or each conduit 214 as well as or in place of having to pass under the bow portion 212 of hull portion 210 and on under the hull 200. Further improved hydrodynamic performance of the amphibian 10 can be achieved by shaping of the conduit, both in terms of its entry 215, exit 216, its path and its cross sectional area along its length. For example, by reducing the cross sectional area along the length of an open channel form of conduit 214, water passing along is forced out of the conduit 214 along the open underside due to its incompressibility, thereby generating lift. In order for the amphibian 10 to make the transition from its hull 200 being in displacement mode to one where it is planing, the through water speed of the amphibian 10 must be increased to achieve the necessary hydrodynamic lift. The hull 200 and bow portions 212, 222 of the hull portions 210, 220 are key in reducing the drag of the hull 10 and facilitating the necessary gain in speed of the amphibian through the water. Once on the plane, the hull 200 provides directional stability. However, the hull 200 may be supplemented with conventional strakes or strakes as discussed in the applicant's UK patent no. GB2401833B.

With the two side portions 220 extending forwardly and/or rearwardly beyond the centre portion 210 (as shown by way of example in the Figures), a hull with desirable flotation and minimum and/or desirable width is provided. Stated differently, extension of the side portions 220 to form the front wheel bay 116 and/or the rear wheel bay 126 provides desirable and/or adequate buoyancy for the amphibian 10 in the water and yet affords for the amphibian 10 to desirably lean and/or turn during use on the land.

With particular reference now to FIG. 1, the amphibian can be seen to include a motorcycle form 100 and a hull form 200. The motorcycle form 100 can have a seat 130, handlebars 140, a prime mover (not shown), a transmission and/or speed change transmission (not shown) and other components known to those skilled in the art that are used, attached, etc. with or to a motorcycle. For example, the rear wheel 120 can have a rear mudguard 121, a drive chain, and the like. In addition, the front wheel 110 can have a front mud guard (not shown), however this is not required. Alternatively or additionally, fenders or mud guards may be fixed to the motorcycle form 100, hull form 200 or other part that does not move with the wheels 110, 120, at the front and/or the back.

Referring next to FIG. 2, the underside of the hull 200 can be seen in detail. The overall hull 200 is defined by the combination of the centre portion 210 and the side portions 220, which are preferably rigid with respect to one another and together form a continuous outer hull surface. The hull 200 may be said to have a bow at the forward end (direction 1) and a stern or transom at the rearward end (direction 2). The centre portion 210 has a forward end defining a centre bow 212 or centre portion 212 of the bow. Each of the side portions 220 has a forward end defining a side bow 222 or a side portion 222 of the bow. As used herein, a bow is the fowardmost end of the hull 200 or portion of the hull 200. In some instances, the side portions 220 can extend in a forwardly direction 1 beyond the centre portion 210 and create a front wheel bay 116. In addition the two side portions 220 can extend in a rearwardly direction 2 beyond the centre portion 210 and create a rear wheel bay 126. The front wheel 110 can be located at least partially within the front wheel bay 116 and the rear wheel 120 can be located at least partially within the rear wheel bay 126. The hull 200 can also have a waisted portion 204 that affords a rider of the amphibian 10 the ability to place one or more feet on a ground surface in order to stabilize or hold the amphibian 10 in an upright position while in use on land when stopped. In addition, the hull 200 can have one or more platforms or sills 201 that afford for a rider to place their feet while riding the amphibian 10 on land or water.

When on land, the amphibian 10 may be propelled by the rear wheel 120 and/or front wheel 110 (or front or rear tracks where provided). When on water, one or more jet drives or propellers or other marine propulsion means may be used. A pair of jet drives 230 and 232 are shown in FIG. 2. Each jet drive 230, 232 has respective inlet 234, 236 and respective outlet 238, 240. The jet drive 230 is disposed at least partially in one of the side portions 220 on one side of the rear wheel bay 126 and the other jet drive 232 is disposed at least partially in the other side portion 220 on the opposite side of the rear wheel bay 126. Alternatively, a single jet drive or jet drive propulsion system (not shown) may be used. The single jet drive may have one or more inlets and one or more outlets, and be beneficially packaged as necessary. For example, the single jet drive may disposed centrally or at least partially in one of the side portions 220. The inlet(s) and outlet(s) may be positioned as necessary, e.g. with ducts to provide ducted flow around or on one or both sides the rear wheel 120.

Referring next to FIG. 3, a side view of the embodiment shown in FIGS. 1 and 2 is shown with the front wheel 110 and the rear wheel 120 in a protracted position. It will be appreciated that with the front wheel 110 and the rear wheel 120 in the protracted position, one can operate the amphibian 10 on land as one would generally operate a motorcycle. FIG. 3 also illustrates in phantom the front wheel 110 and the rear wheel 120 in a retracted position such that the amphibian can be operated at high speed, planing, on the water. An indicative water line is shown at w, representing where the water line may be with the amphibian 10 in full displacement mode in the water and not moving. Of course, the actual water line may vary from this position dependent upon the specific parameters of the amphibian 10. It will be appreciated that with the two side portions 220 extending in the forwardly direction 1 and/or in the rearwardly direction 2, the hull 200 provides a desirable buoyancy for the amphibian 10 while maintaining a desirable and/or minimum width such that leaning and/or turning can be achieved while in use on land. It will be further appreciated that at least one wheel retraction system can be included (not shown) in order to move the front wheel 110 and/or the rear wheel 120 between the protracted position for use of the amphibian 10 on land and the retracted position for use of the amphibian on water.

The front wheel bay 116 and/or the rear wheel bay 126 can have a cover, closure and the like across a top or upper portion thereof, however this is not required. Such a top or upper cover or closure may be fixed in place so as to form part of the upper, surface of the body or hull, may be flexible, or may be operable. In contrast, the front wheel bay 116 and the rear wheel 126 bay do not have a closure along a bottom or lower portion thereof. This means that there is no closure or cover in the outer/lower surface of the hull 200. In this manner, the chance or threat of a cover, closure and the like of being lost, broken, distorted, etc. during use is prevented. In addition, any malfunction of such a cover, closure, etc. due to contamination by sand, mud, dirt, grass, etc. is also prevented. A closure is distinguished from a fender or mud guard, which is permanently protracted whether the wheel is protracted or retracted, and does not move from one position to another during normal operation of the amphibian. Generally, a closure will be located below the wheel when closed. A mud guard will often be fixed to the body work and located above the wheel. When a mud guard is mounted on the forks supporting the wheel, it will be held in a fixed relationship to the wheel. Its orientation may vary as the wheel is protracted or retracted, however unlike a closure, it will not cover a gap in the hull.

Figure 4:
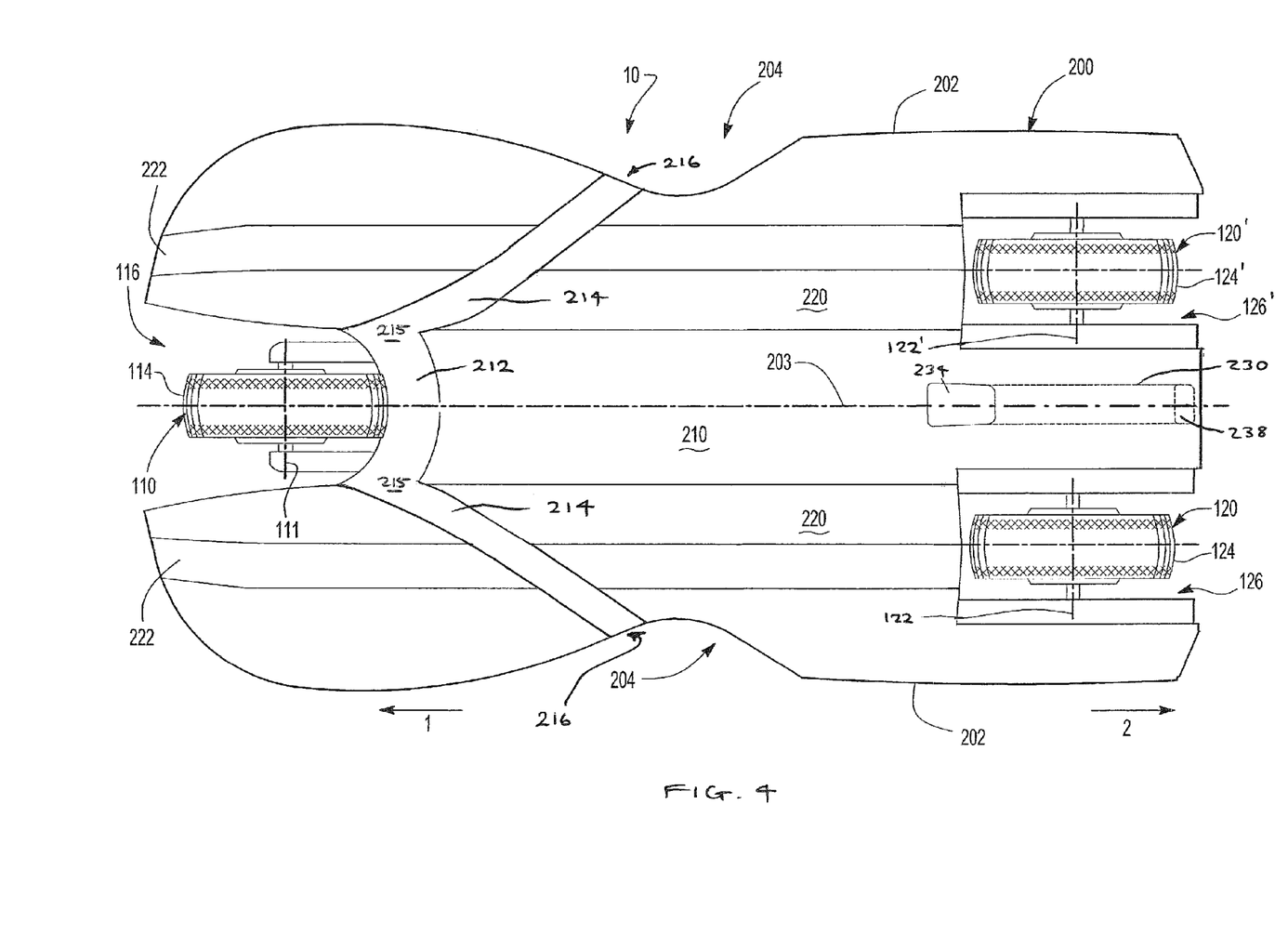
FIG. 4 is a schematic bottom plan view of a three wheel amphibian according to a further preferred embodiment of the present invention.

Referring next to FIG. 4, a further preferred embodiment of the present invention can be seen to comprise a three wheeled amphibian 10 that has desirable leaning and/or turning capability while in use on the land and desirable buoyancy and stability while in use on water. It will be appreciated that for the purposes of the present invention, the terms "three wheel" or "tricycle" includes three wheel or tricycle mopeds, scooters and other three-wheeled vehicles. In addition, other vehicles that use more than one wheel or track as a front wheel and/or as one or more of the rear wheels are included within the term three wheel or tricycle. Again, for example, and for illustrative purposes only, a three wheel or tricycle amphibian that has two wheels spaced closely together for use as the front and/or as one or more of the rear wheels is included within the use of the term three wheel or tricycle herein. In this case, there is a front wheel station and two rear wheel stations, with one or more wheels or tracks provided in each wheel station. Furthermore, the amphibian need not be a tricycle (i.e. not limited to an amphibian having handlebars for steering and/or sit astride seating). Alternatively, for example, the amphibian may take the form of a sit in vehicle or buggy with other steering input (e.g. a steering wheel).

The amphibian 10 can be seen to comprise a front wheel 110, preferably provided with a front suspension system (not shown), and two rear wheels 120, 120' again preferably provided with a rear suspension system (not shown). A track or tracks may be used as an alternative to either or both of the front and rear wheels 110, 120, 120'. At least one wheel retraction system (not shown) that is operable to move the front wheel 110 and/or the rear wheels 120, 120' between a protracted position for use of the amphibian 10 on land and a retracted position for use of the amphibian 10 on water is preferably included. The amphibian 10 is provided with a hull 200 with a centre portion 210 and two oppositely disposed and spaced apart side portions 220. Alternatively, other hull forms may be employed. Each hull portion 210, 220 has a forward end defining a bow or bow portion 212, 222 and the hull portions 210, 220 are preferably fixed relative to one another and form a generally rigid assembly with a generally continuous outer hull surface.

The two side portions 220 extend forwardly beyond the centre portion 210 a predefined distance and form a front wheel bay 116. The front wheel 110 can be located at least partially within the front wheel bay 116 and the two side portions 220 can extend forwardly up to or beyond a rotation axis 111 of the front wheel 110 when in the protracted land engaging position. In some instances, the two side portions 220 can extend at least partially or generally up to or equal to a front surface of the front wheel 110 or, in the alternative, the two side portions 220 can extend beyond the front surface of the front wheel 110 when the front wheel 110 is in the protracted position. The two side portions 220 can also extend rearwardly along with the centre portion 210 a predefined distance and form rear wheel bays 126, 126'. The rear wheels 120, 120' can be located at least partially within the rear wheel bays 126, 126' and the two side portions 220 can extend rearwardly along with the centre portion 210 up to or beyond a rotation axis 122, 122' of the rear wheels 120, 120' when in the protracted position. In some instances, the two side portions 220 and centre portion 210 can extend rearwardly at least partially or generally up to or equal to a rear surface of the rear wheels 120, 120' or, in the alternative, the two side portions 220 and centre portion 210 can extend rearwardly beyond the rear surface of the rear wheels 120, 120' when the rear wheels 120, 120' are in the protracted position.

As with the first preferred embodiment described above, a conduit 214 is provided in one or both of the two side portions 220 so as to provide at least one pathway between the front wheel bay 116 the respective lateral side or sides of the amphibian 10 for fluids (water and/or air) to pass. Again, the or each conduit 214 may take any suitable form, as described in detail above for the first preferred embodiment. For example, the conduit 214 may be open on the underside in the form of a channel, or may be at least partially closed (across and/or lengthways of the conduit 214) by the hull 200 or other part of the amphibian 10 so as to form a tunnel. Indeed, the conduit 214 may take the form of a tube (e.g. a discrete part or formed by other parts of the amphibian 10). The cross section of the conduit 214 may be substantially uniform, or may vary along its length. More particularly, the cross section of the conduit 214 may reduce along its length in the rearward direction 2. Alternatively, the cross section of the conduit 214 may increase along its length in the rearward direction 2. The entry 215 to the conduit 214 may be integrated with either one or more of the bow or bow portions 212, 222 of the hull portions 210, 220 or may be a discrete entry (such as with a discrete tube). Preferably, the entry 215 to the conduit 214 is open at and/or to the front wheel bay 116. The exit 216 from the conduit 214 may be an exit (discrete or otherwise) laterally to the side of the amphibian 10, or may be integrated with either one or both of the hull portions 210, 220. Alternatively, the conduit 214 may continue along a portion of, or the entire length of, the amphibian 10 exiting at the rear stern or transom, or into and/or at either or both of rear wheel bays 126, 126'. The or each conduit 214 provides for improved hydrodynamic performance of the amphibian 10 when on water as the accumulation of water in the front wheel bay 116 resulting from forward motion of the amphibian 10 can travel along the or each conduit 214 as well as or in place of having to pass under the bow portion 212 of hull portion 210 and on under the hull 200. Further improved hydrodynamic performance of the amphibian 10 can be achieved by shaping of the conduit, both in terms of its entry 215, exit 216, its path and its cross sectional area along its length. For example, by reducing the cross sectional area along the length of an open channel form of conduit 214, water passing along is forced out of the conduit 214 along the open underside due to its incompressibility, thereby generating lift. In order for the amphibian 10 to make the transition from its hull 200 being in displacement mode to one where it is planing, the through water speed of the amphibian 10 must be increased to achieve the necessary hydrodynamic lift. The hull 200 and bow portions 212, 222 of the hull portions 210, 220 are key in reducing the drag of the hull 10 and facilitating the necessary gain in speed of the amphibian through the water. Once on the plane, the hull 200 provides directional stability. However, the hull 200 may be supplemented with conventional strakes or strakes as discussed in the applicant's UK patent no. GB2401833B.

Again, with the two side portions 220 extending forwardly and/or rearwardly beyond the centre portion 210, a hull with desirable flotation and minimum and/or desirable width is provided. Stated differently, extension of the side portions 220 to form the front wheel bay 116 and/or the rear wheel bays 126, 126' provides desirable and/or adequate buoyancy for the amphibian 10 in the water and yet affords for the amphibian 10 to desirably lean and/or turn during use on the land.

Figure 5:
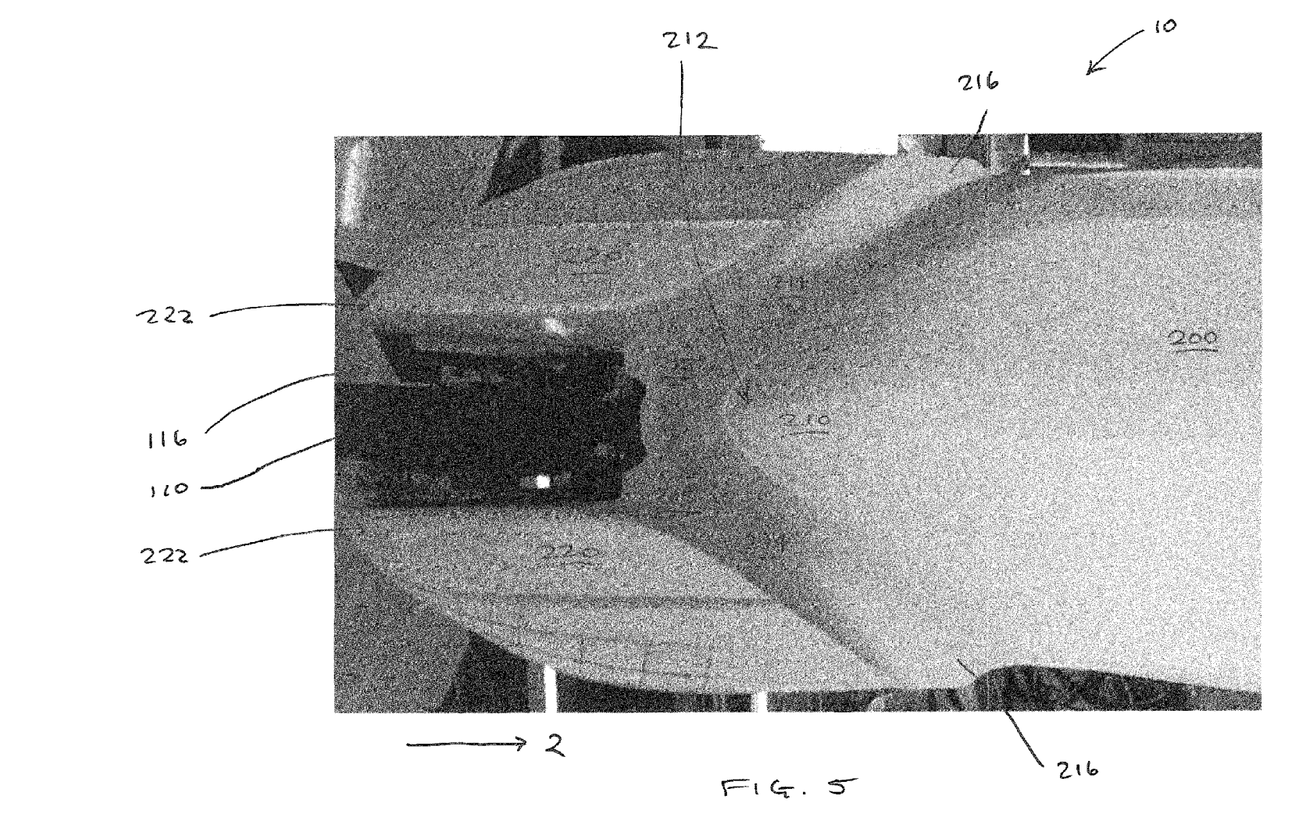
FIG. 5 is a detailed schematic bottom plan view of a frontal bow section of an amphibian according to a further preferred embodiment of the present invention.
Figure 6:
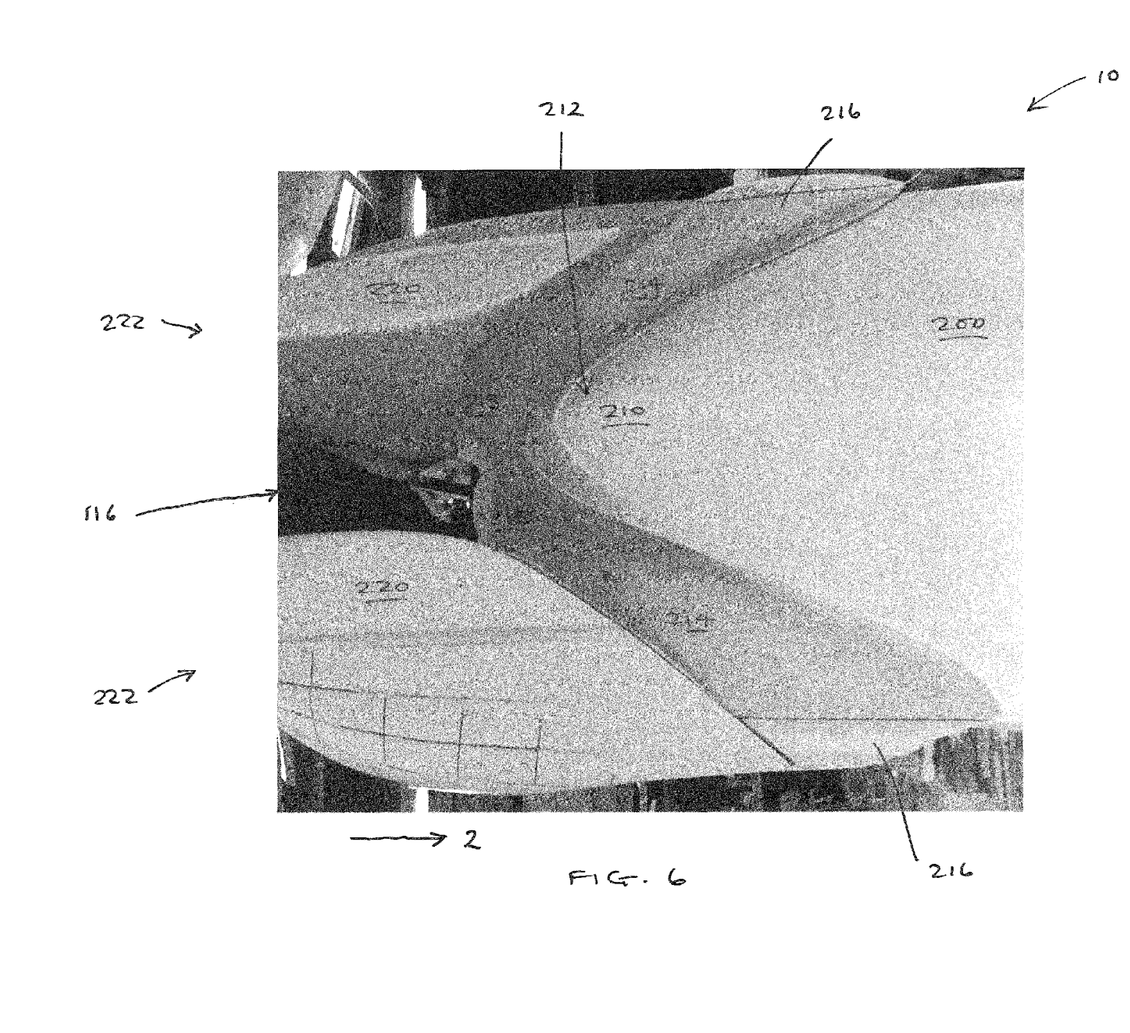
FIG. 6 is an enlarged detailed schematic view from below and to one side of the frontal bow section of FIG. 5.

Referring next to FIGS. 5 and 6, a frontal bow section of an amphibian according to a further preferred embodiment of the present invention can be seen. In this further embodiment, the amphibian 10 is provided with a hull 200 with a more rounded and pointed centre portion 210 and two oppositely disposed and spaced apart side portions 220. Indeed, this demonstrates what might be considered as an alterative hull form as alluded to in the embodiments described above. Here, the hull 200 may be considered to simply comprise a main hull denoted by reference numeral 200 provided with a bow 210, and two forward side hull portions 220 each with a bow 222. As before, therefore, each hull portion 200, 220 has a forward end defining a bow or bow portion 212, 222 and the hull portions 210, 220 are preferably fixed relative to one another and form a generally rigid assembly with a generally continuous outer hull surface. The two side portions 220 extend forwardly beyond the main or centre portion 210 a predefined distance and form a front wheel bay 116. The front wheel 110 can be located at least partially within the front wheel bay 116 and the two side portions 220 can extend forwardly up to or beyond a rotation axis 111 of the front wheel 110 when in the protracted land engaging position. The two side portions 220 extend at least partially towards a front surface of the front wheel 110.

Conduits 214 are provided in or between each of the two side portions 220 and the main or centre portion 210 so as to provide one or more pathways between the front wheel bay 116 the respective lateral side or sides of the amphibian 10 for fluids (water and/or air) to pass. Each conduit 214 is open on the underside in the form of a channel, and the cross section of each conduit 214 varies along its length. More particularly, the cross section of each conduit 214 becomes shallower but wider along its length in the rearward direction 2. The entry 215 to the conduit 214 is integrated with the bow portion 212 of the hull portion 210. The exit 216 of each conduit 214 is a discrete exit laterally to the side of the amphibian 10. Each conduit 214 provides for improved hydrodynamic performance of the amphibian 10 when on water as the accumulation of water in the front wheel bay 116 resulting from forward motion of the amphibian 10 can travel along each conduit 214 as well as or in place of having to pass under the bow portion 212 of hull portion 210 and on under the hull 200. Further improved hydrodynamic performance of the amphibian 10 is achieved by shaping of the conduit, both in terms of its entry 215, exit 216 and its cross sectional area along its length. The cross sectional area reduces slightly along the length of the open channel form of each conduit 214, and so water passing along is forced out of each conduit 214 along the open underside due to its incompressibility, thereby generating lift.

Figure 7:
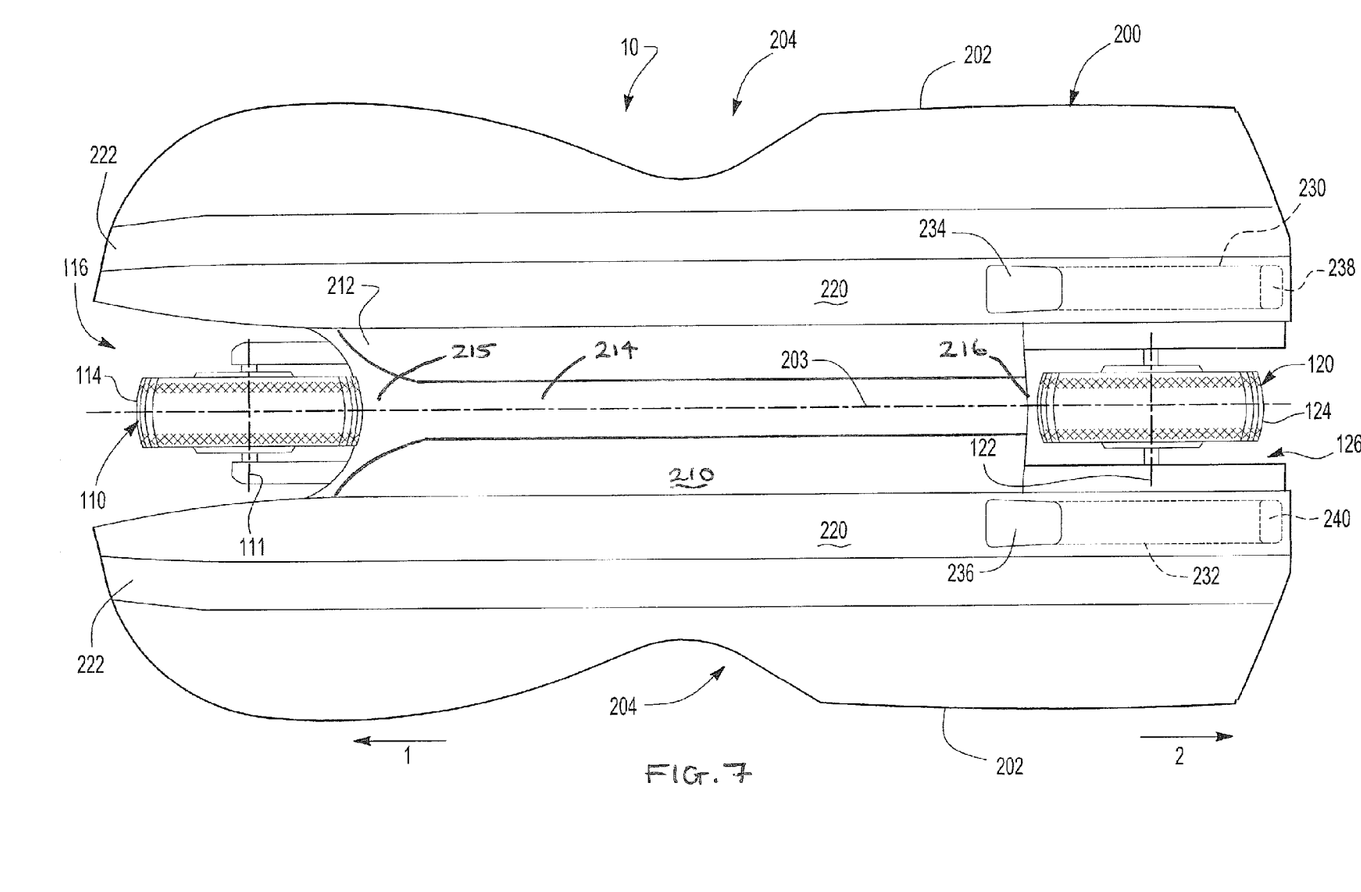
FIG. 7 is a schematic bottom plan view of a two wheel amphibian according to a further preferred embodiment of the present invention.

Referring next to FIG. 7, a further preferred embodiment of the present invention can be seen to comprise a two wheeled amphibian 10 that has desirable leaning and/or turning capability while in use on the land and desirable buoyancy and stability while in use on water. This alternative embodiment is similar to that described above with reference to FIGS. 1 to 3, and as such like features denoted by like reference numerals will not be described further here. Instead, reference is made to the description above. In this embodiment, however, the conduit 214 provides a pathway between the front wheel bay 116 and rear wheel bay 126 for fluids (water and/or air) to pass. Alternatively, the conduit could be routed to the rear or transom of the amphibian 10. The conduit 214 (or each, if plural, or each part if branches of the conduit 214 are provided) may take any suitable form. For example, the conduit 214 may be open on the underside in the form of a channel, as shown, or may be at least partially closed (across and/or lengthways of the conduit 214) by the hull 200 or other part of the amphibian 10 so as to form a tunnel. Indeed, the conduit 214 may take the form of a tube (e.g. a discrete part or formed by other parts of the amphibian 10), either inside of the lower planing surface of the hull 200, or otherwise. The cross section of the conduit 214 may be substantially uniform, as shown, or may vary along its length. More particularly, the cross section of the conduit 214 may reduce along its length in the rearward direction 2. Alternatively, the cross section of the conduit 214 may increase along its length in the rearward direction 2. The entry 215 to the conduit 214 may be integrated with either one or more of the bow or bow portions 212, 222 of the hull portions 210, 220 or may be a discrete entry (such as with a discrete tube). Preferably, the entry 215 to the conduit 214 is open at and/or to the front wheel bay 116. The exit 216 from the conduit 214 may be an exit (discrete or otherwise) laterally to the side of the amphibian 10, or may be integrated with either one or both of the hull portions 210, 220. Alternatively, the conduit 214 may continue along a portion of, or the entire length of, the amphibian 10 exiting at the rear stern or transom, or into and/or at a rear wheel bay 126 (as shown). The or each conduit 214 provides for improved hydrodynamic performance of the amphibian 10 when on water as the accumulation of water in the front wheel bay 116 resulting from forward motion of the amphibian 10 can travel along the or each conduit 214 as well as or in place of having to pass under the bow portion 212 of hull portion 210 and on under the hull 200. Further improved hydrodynamic performance of the amphibian 10 can be achieved by shaping of the conduit, both in terms of its entry 215, exit 216, its path and its cross sectional area along its length.

Figure 8:
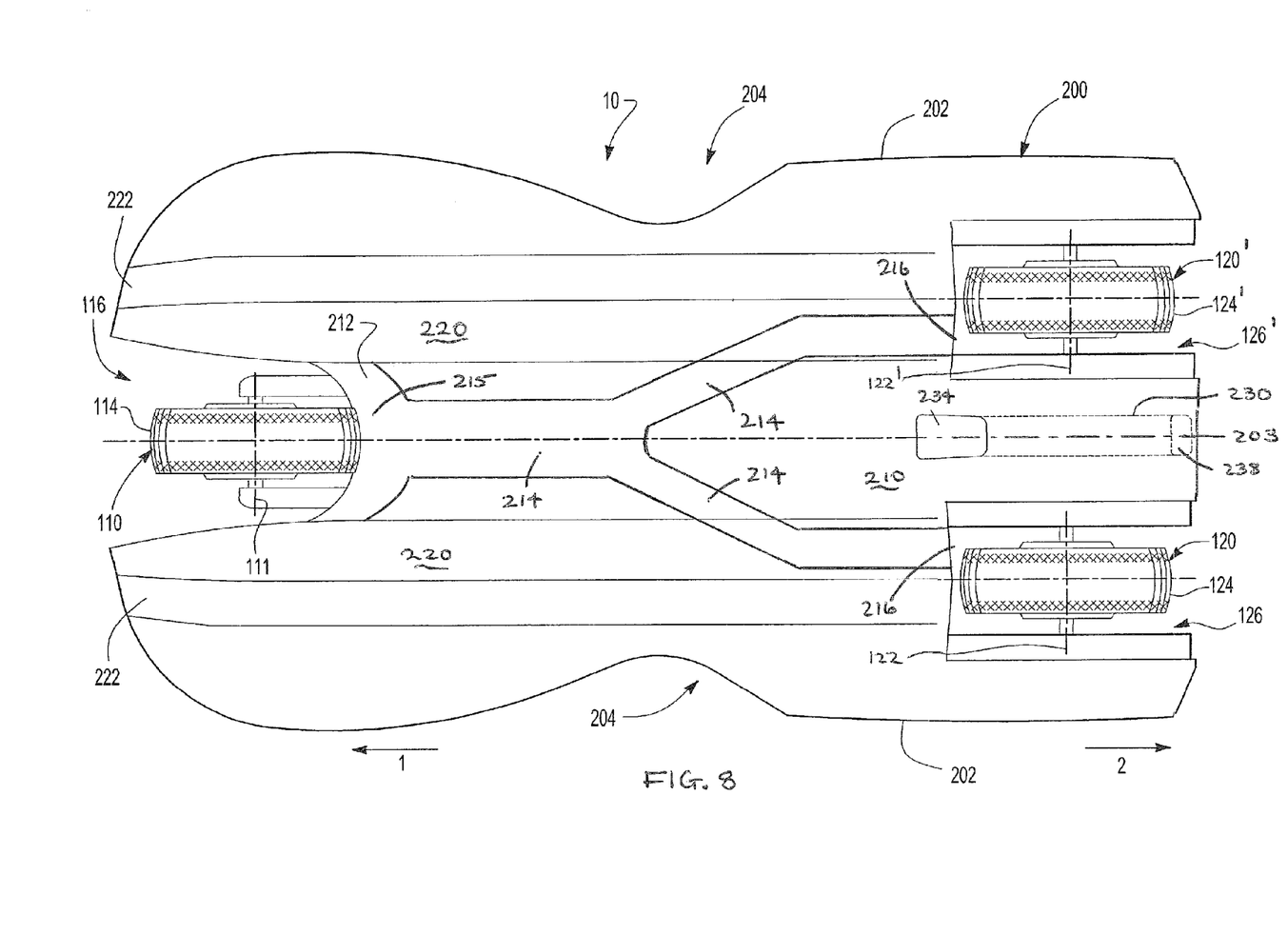
FIG. 8 is a schematic bottom plan view of a three wheel amphibian according to a further preferred embodiment of the present invention.

Referring next to FIG. 8, a further preferred embodiment of the present invention can be seen to comprise a three wheeled amphibian 10 that has desirable leaning and/or turning capability while in use on the land and desirable buoyancy and stability while in use on water. This alternative embodiment is similar to that described above with reference to FIG. 4, and as such like features denoted by like reference numerals will not be described further here. Instead, reference is made to the description above. In this embodiment, however, the conduit 214 provides a pathway between the front wheel bay 116 and rear wheel bays 126, 126' for fluids (water and/or air) to pass. The conduit 214, as shown, branches mid-way and provides two exits, one at each of wheel bays 126, 126'. However, this branching is optional and just one conduit, or multiple discrete conduits, may be provided. Alternatively, the or each conduit (or branch thereof) could be routed to the rear or transom of the amphibian 10. The conduit 214 (or each, if plural) may take any suitable form. For example, the conduit 214 may be open on the underside in the form of a channel, as shown, or may be at least partially closed (across and/or lengthways of the conduit 214) by the hull 200 or other part of the amphibian 10 so as to form a tunnel. Indeed, the conduit 214 may take the form of a tube or tubes (e.g. a discrete part or formed by other parts of the amphibian 10), either inside of the lower planing surface of the hull 200, or otherwise. The cross section of the conduit 214 may be vary, as shown, or may be substantially uniform along its length. More particularly, the cross section of the conduit 214 may reduce along its length in the rearward direction 2. Alternatively, the cross section of the conduit 214 may increase along its length in the rearward direction 2. The entry 215 to the conduit 214 may be integrated with either one or more of the bow or bow portions 212, 222 of the hull portions 210, 220 or may be a discrete entry (such as with a discrete tube). Preferably, the entry 215 to the conduit 214 is open at and/or to the front wheel bay 116. The exits 216 from the conduit 214 may be an exit (discrete or otherwise) laterally to the side of the amphibian 10, or may be integrated with either one or both of the hull portions 210, 220. Alternatively, the conduit 214 may continue along a portion of, or the entire length of, the amphibian 10 exiting at the rear stern or transom, or into and/or at a rear wheel bays 126, 126' (as shown). The or each conduit 214 provides for improved hydrodynamic performance of the amphibian 10 when on water as the accumulation of water in the front wheel bay 116 resulting from forward motion of the amphibian 10 can travel along the or each conduit 214 as well as or in place of having to pass under the bow portion 212 of hull portion 210 and on under the hull 200. As before, further improved hydrodynamic performance of the amphibian 10 can be achieved by shaping of the conduit, both in terms of its entry 215, exit 216, its path and its cross sectional area along its length.

Although the hull 200 has been described as a hull, it is common for amphibians to have a hull, which is a lower water facing/engaging enclosure, and a body, which is an upward enclosure. These may be joined together at a peripheral joint, as disclosed in applicant's co-pending application published as US 2006/0199499, which is incorporated herein in its entirety by reference. In the alternative, a singular hull can be used which may or may not have a lower body with a separate but permanently attached upper body. Such a hull 200 can provide attractive styling for the amphibian, can provide sealing of the steering system against water ingress, can provide sealing of the at least one wheel retraction system against water ingress, and can provide mountings for desirable equipment such as an instrument console, a windscreen and the like.

Whilst in certain embodiments the hull has been described as comprising central and side portions, these are only exemplary and other hull configurations are possible. For example, the hull may comprise a main hull with forwardly positioned and laterally spaced apart hull portions. The forwardly positioned and laterally spaced apart hull portions may define a front wheel bay. Alternatively, the hull may comprise two laterally spaced apart hull portions running fore and aft, with a lower planing surface at least partially joining the two laterally spaced apart hull portions. Yet further, the hull may comprise one central and two laterally spaced apart hull portions running fore and aft, with a lower planing surface at least partially joining the centre and two laterally spaced apart hull portions. The various hull forms may have a wheel bay or discontinuity provided at a forward end of the hull.

The term "discontinuity" as used herein includes within its ambit the simple provision, or forming of, a wheel bay in or on the wet side or outside of the hull, and is not limited to a discontinuity or other irregularity in, or through, the surface of the hull. As such, a wheel bay (and in particular each of wheel bays 116, 126 and 126') is a discontinuity in the hull.

As used herein, the term "outside" or "wet side" of the hull is a side or surface of the hull exposed to water, as opposed to the inside of the hull, which is normally substantially dry, being effectively sealed against water ingress. Consequently, the front and/or rear wheels 110, 120 located in the front and/or rear wheels bays 116, 126, 126' are located on the outside or wet side of the hull in both the protracted and retracted position. It is acknowledged that a conventional engine compartment requires ingress and egress of air for cooling, combustion and exhaust purposes, but such air intakes and exhaust openings have labyrynthine passages, commonly known as dorades, in order to exclude as much water as possible from the "inside" or "dry side" of the hull. That said, bilge or other pumps may be provided on the "inside" or "dry side" of the hull to remove unwanted water.

The present invention may further comprise a frame, hull or body form or other structure for supporting one or components or sub-assemblies of the amphibian. The front wheel and front suspension system can be mounted to said frame, hull or body form or other structure mounted to said frame, and the rear wheel(s) and rear suspension system(s) can also be mounted to said frame, hull or body form or other structure mounted to said frame.

Each feature disclosed in this specification (including the accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features. In addition, all of the features disclosed in this specification (including the accompanying claims, abstract and drawings), and/or all of the steps of any method or process so disclosed, may be combined in any combination, except combinations where at least some of such features and/or steps are mutually exclusive. Accordingly, while different embodiments of the present invention have been described above, any one or more or all of the features described, illustrated and/or claimed in the appended claims may be used in isolation or in various combinations in any embodiment. As such, any one or more feature may be removed, substituted and/or added to any of the feature combinations described, illustrated and/or claimed. For the avoidance of doubt, any one or more of the features of any embodiment may be combined and/or used separately in a different embodiment with any other feature or features from any of the embodiments.

The invention is not restricted to the illustrative embodiments described above. Whereas the present invention has been described in relation to what is presently considered to be the most practical and preferred embodiments, it is to be understood that the invention is not limited to the disclosed arrangements but rather is intended to cover various modifications and equivalent constructions included within the scope of the appended claims.

The invention claimed is:

1. An amphibian operable in land and marine modes, the amphibian comprising:
    a hull;
    at least one of a discontinuity provided in and a discontinuity formed by the hull; and
    at least one of a retractable wheel and a retractable track assembly at least partially located in the at least one discontinuity, wherein:
    the hull is a planing hull;
    the at least one discontinuity comprises at least one of an exposed frontal wheel bay and an exposed frontal track bay provided in a front half of the hull of the amphibian; and
    the amphibian further comprises at least one of a conduit which opens and a conduit provided with an entry which at least one of opens into and opens at the at least one discontinuity and is configured for channelling, in use, fluid away from the at least one discontinuity.

2. The amphibian as claimed in claim 1 wherein the at least one conduit is configured for channelling, in use, fluid away from the at least one discontinuity to at least one of a side, along, underneath, inside, and to a rear of the amphibian.

3. The amphibian as claimed in claim 1 wherein the at least one conduit is configured for channelling, in use, fluid away from the at least one discontinuity along the underside of the amphibian.

4. The amphibian as claimed in claim 1, wherein the at least one conduit is at least partially open at a point along a length of the at least one conduit in the form of a channel.

5. The amphibian as claimed in claim 1, wherein the at least one conduit is closed at a point along a length of the at least one conduit in the form of at least one of a tunnel and a tube.

6. The amphibian as claimed in claim 1, wherein the cross section of the at least one conduit is substantially uniform along a length of the at least one conduit.

7. The amphibian as claimed in claim 1, wherein the cross section of the at least one conduit varies along a length of the at least one conduit.

8. The amphibian as claimed in claim 7 wherein the cross section of the at least one conduit reduces along the length in a direction downstream from an entry of the at least one conduit.

9. The amphibian as claimed in claim 7 wherein the cross section of the at least one conduit increases along the length in a direction downstream from an entry of the at least one conduit.

10. The amphibian as claimed in claim 1, wherein the at least one conduit is formed in an underside of the hull.

11. The amphibian as claimed in claim 1, wherein the at least one conduit is a discrete part of the amphibian separate from the hull.

12. The amphibian as claimed in claim 1, wherein the at least one conduit is formed, at least in part, inside of an underside of the hull.

13. The amphibian as claimed in claim 1, wherein the at least one conduit has an exit for fluid at any one or more of a side and an end of the at least one conduit of a length of the at least one conduit length.

14. The amphibian as claimed in claim 1, wherein the at least one conduit channels, in use, water which accumulates in the at least one discontinuity resulting from forward motion of the amphibian when at least one of in and on water in marine mode.

15. The amphibian as claimed in claim 14 wherein:
    the at least one conduit is formed in an underside of the hull and is partially open at a point along a length of the at least one conduit in the form of a channel in the underside of the hull; and
    the cross section of the at least one conduit reduces along the length of the at least one conduit in a direction downstream from an entry of the at least one conduit, wherein:
    in use, water passing along the at least one conduit is forced out of the conduit along the open underside thereby generating lift.

16. The amphibian as claimed in claim 1, wherein the at least one discontinuity provided in the hull comprises a front wheel bay.

17. The amphibian as claimed in claim 1, wherein the at least one discontinuity provided in the hull comprises a single front wheel bay.

18. The amphibian as claimed in claim 1, wherein the at least one discontinuity provided in the hull comprises a front wheel bay formed on the outside of the hull.

19. The amphibian as claimed in claim 16, wherein the hull extends between a bow and a stern/transom, the bow having a central bow portion and a pair of side bow portions, the central bow portion being disposed rearwardly of the side bow portions so as to define the front wheel bay.

20. The amphibian as claimed in claim 1, wherein at least one of a wheel and a track of the at least one retractable wheel and retractable track assembly is retracted above a lowest point of the hull when operating in marine mode, and at least part of the at least one of the wheel and track is protracted below the lowest point of the hull when operating in land mode.

21. The amphibian as claimed in claim 1, further comprising:
    a land propulsion unit to propel the amphibian on land in the land mode, the land propulsion unit comprising at least one of the wheel and the track; and
    a marine propulsion unit to propel the amphibian on water in the marine mode.

22. The amphibian as claimed in claim 21 wherein the marine propulsion unit comprises at least one of jet drives and propellers.

23. The amphibian as claimed in claim 22 wherein the at least one of jet drives and propellers can propel the amphibian to a speed where sufficient hydrodynamic lift is generated to enable the amphibian to plane.

24. The amphibian as claimed in claim 1, wherein the amphibian is an amphibian motorcycle having at least one of a front wheel and track and at least one of a rear wheel and track.

25. The amphibian as claimed in claim 1, wherein the amphibian is an amphibian motorcycle having at least one of a front wheel and track station and at least one of a rear wheel and track station.

26. The amphibian as claimed in claim 1, wherein the amphibian is an amphibian tricycle having at least one of a front wheel and track in a front half of the amphibian and at least one of two rear wheels and tracks in a rear half of the amphibian.

27. The amphibian as claimed in claim 1, wherein the amphibian is an amphibian tricycle having at least one of a front wheel and track station in a front half of the amphibian and at least one of two rear wheel and track stations in a rear half of the amphibian.

28. The amphibian as claimed in claim 25, wherein the amphibian comprises at least one of one or more wheels and tracks in at least one of the front wheel and track station and the rear wheel and track stations.

29. The amphibian as claimed in claim 1, wherein the amphibian comprises a sit-in amphibian having at least one of a front wheel and track in a front half of the amphibian and at least one of a rear wheel and track in a rear half of the amphibian.

30. The amphibian as claimed in claim 1, wherein the amphibian comprises a sit-in amphibian having at least one of a front wheel and track in a front half of the amphibian and at least one of at least two rear wheels and tracks in a rear half of the amphibian.

31. The amphibian as claimed in claim 1, wherein the amphibian comprises a sit-in amphibian having at least one of a front wheel and track station in a front half of the amphibian and at least one of a rear wheel and track station in a rear half of the amphibian.

32. The amphibian as claimed in claim 1, wherein the amphibian is a sit-in amphibian having at least one of a front wheel and track station in a front half of the amphibian and at least one of at least two rear wheel and track stations in a rear half of the amphibian.

33. The amphibian as claimed in claim 1, wherein the amphibian has a steering input for use by a rider or driver.

34. An amphibian operable in land and marine modes, the amphibian comprising:
- a hull;
- at least one of a wheel bay and a track bay provided in, or formed by, the hull; and
- at least one of a retractable wheel and a retractable track assembly at least partially located in the at least one of the wheel bay and the track bay, wherein:
- the hull is a planing hull;
- the at least one of the wheel bay and the track bay comprises at least one of an exposed frontal wheel bay and an exposed frontal track bay provided in a front half of the hull of the amphibian; and
- the amphibian further comprises at least one of a conduit which opens and a conduit provided with an entry which at least one of opens into and opens at the at least one of the wheel bay and the track bay and is configured for channelling, in use, fluid away from the at least one wheel or track bay.

* * * * *